July 13, 1943.    H. F. WATERS    2,324,048
CONTAINER FOR BAKERY PRODUCTS
Filed Oct. 15, 1941    3 Sheets-Sheet 1

INVENTOR.
HARRY F. WATERS
BY
ATTORNEY

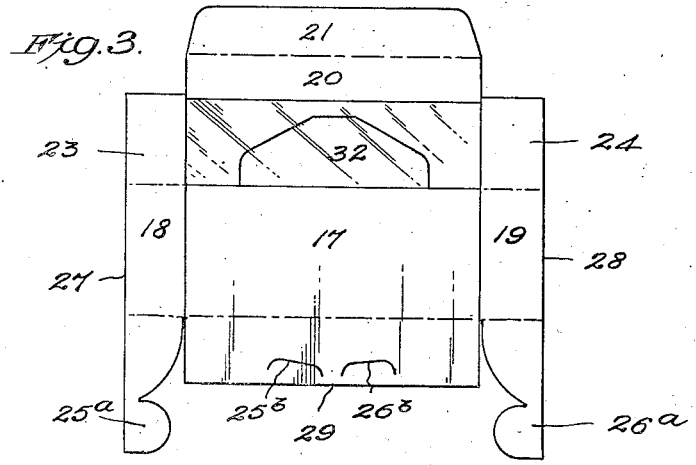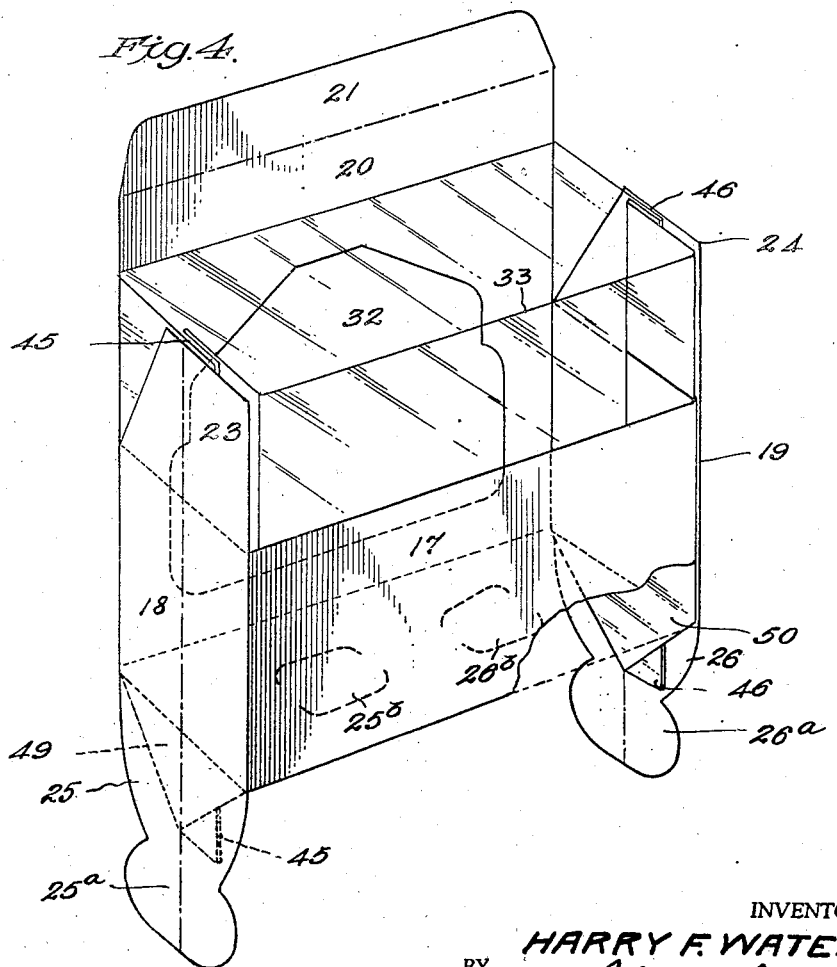

July 13, 1943.   H. F. WATERS   2,324,048
CONTAINER FOR BAKERY PRODUCTS
Filed Oct. 15, 1941   3 Sheets-Sheet 3
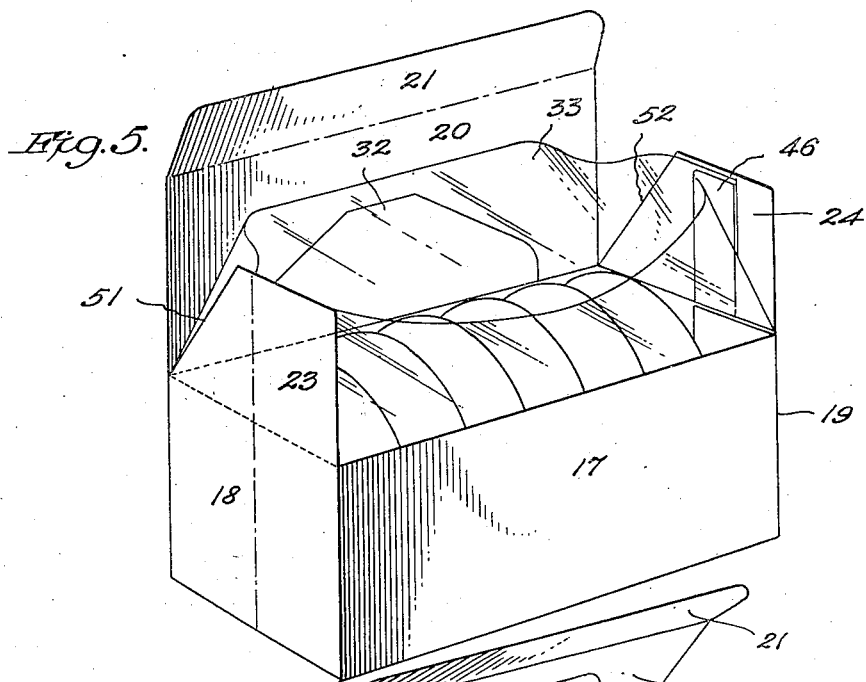
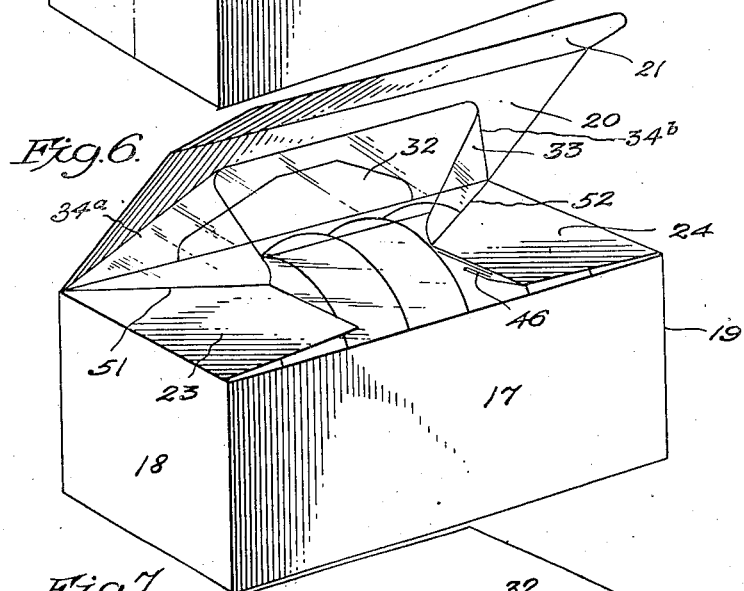
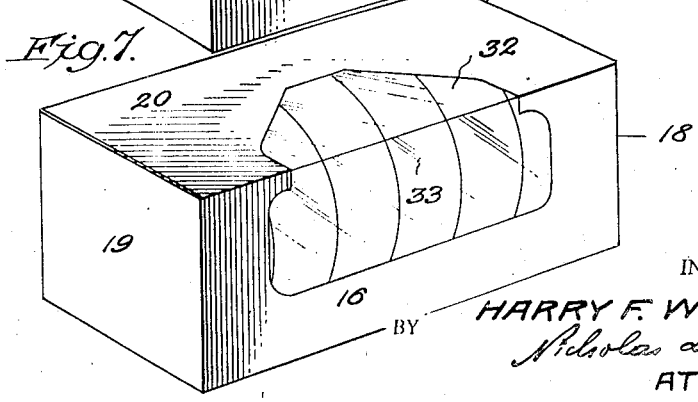
INVENTOR.
HARRY F. WATERS
BY
ATTORNEY Patented July 13, 1943

2,324,048

UNITED STATES PATENT OFFICE 2,324,048

CONTAINER FOR BAKERY PRODUCTS

Harry F. Waters, New York, N. Y.

Application October 15, 1941, Serial No. 415,008

5 Claims. (Cl. 229—14)

The present invention relates to containers, and, more particularly, to a container especially adapted for the packaging of bakery products, and to a method of producing such containers.

Heretofore, considerable difficulty was experienced in satisfactorily packaging bakery products such as doughnuts, cakes, and the like. The principal difficulty resided in the circumstance that most bakery products contain fat which has a detrimental effect on the material of the container unless the container is sufficiently protected against such influence. Generally speaking, the cardboard containers principally used for the purpose were objectionable because the product to be packaged was in direct contact with the cardboard constituting the container. This contact not only caused contamination of the product but the fat contained in the product would frequently strike through the carton and would interfere with the appearance of the package. Even when the carton was specially treated, laminated or impregnated with a grease-proof material, it was difficult, if not impossible, to obtain sufficiently leakage-proof closure in the corners of the carton. As a rule, small openings remained in such regions through which fat would leak out and dust and dirt would find its way into the package. A further difficulty consisted in the circumstance that most bakery products "breathe" and for the reason it is undesirable to pack them in a hermetically sealed condition. As a result when it was attempted to wrap the bakery product into grease-proof liner sheets prior to inserting them into the container, frequently difficulty was experienced in that the substantially air-tight closure of the liner sheets would cause the product to "sweat" and this circumstance would decrease the saleability of the article. Clearly, the packaging art was faced with a vexatious problem for which, as far as I am aware of, no satisfactory solution has been offered.

I have discovered that the outstanding problem may be solved in a simple and completely satisfactory manner.

It is an object of the present invention to provide a container for bakery products which eliminates the above difficulties and inconveniences.

It is another object of the present invention to provide a container of novel and improved character particularly for bakery products including doughnuts, cakes, and the like, which comprises an outer carton and an inner liner of a substantially grease-proof character.

It is a further object of the invention to provide a container for bakery products which may be shipped and stored in knocked-down form and which may be brought into an operative position for the insertion of the product at a moment's notice.

Still another object of the invention is to provide a container with an inner liner of special character attached thereto, the cooperation between liner and carton being such that upon erection of the carton from collapsed form, the liner is automatically moved into its open position for the reception of the product to be packaged, and upon closing the top portions of the carton, the liner is automatically moved into a position in which the product is completely enveloped by the liner without, however, interfering with the "breathing" of the product.

It is also within the contemplation of the invention to provide a container for bakery products, and the like, which combines simplicity of structure and low cost of production with an attractive appearance and with highly desirable packaging properties.

The invention also contemplates a method for producing the container of the invention on a practical and industrial scale at a low cost.

Other and further objects and advantages of the invention become apparent from the following description taken in conjunction with the accompanying drawings in which:

Fig. 3 shows a similar view of the carton and liner in the collapsed form in which it is shipped and stored;

Fig. 4 is a perspective view, having parts broken away for clarity of illustration, of the container embodying the invention in its erected form ready for receiving the articles to be packaged;

Fig. 5 is a similar perspective view of the container after its bottom flaps have been closed and the articles to be packaged have been inserted therein;

Fig. 6 is a similar perspective view of the package during the process of closing the same and indicating the cooperation between carton and liner; and Fig. 7 shows a perspective view of the completed and closed package.

Broadly stated, according to the principles of my invention, I provide a carton blank of special character cut and scored along a plurality of transverse and longitudinal lines thereby defining a pair of main panels, a pair of medially scored end panels and a medially scored bottom panel positioned between said main panels. To this blank I attach a liner sheet of appropriate dimensions by means of suitably disposed glue lines so that the liner will follow the carton blank in its displacements during the following folding operations. Preferably, the liner sheet is of a translucent or transparent character in order to cooperate with a window provided in the carton blank through which the packaged product may be viewed. While various types of cellulosic or other sheets may be employed, the liner I generally prefer to employ is a special type of glassine paper or a special grade of Cellophane having a substantially grease-proof character but having microscopic pores present in its structure to an extent sufficient to permit "breathing" of the packaged article.

This carton blank and the liner attached thereto are now subjected to various folding operations whereby carton and liner are brought into a position in which the marginal portions of the liner are brought into contacting position. While the lateral marginal portions of the liner may be adhesively secured together, I have found that in most cases it is to be preferred to dispense with such permanent connection and to rely on the overlapping arrangement of such portions for providing sufficient end closure of the cartons. Experience has shown that such structure is highly desirable in that while it prevents the admission of dust and other detrimental agencies into the interior of the package, it also provides restricted channels through which the packaged product may "breathe." I have also provided a novel and special co-ordination of the fold lines and glue lines of the carton whereby a novel and automatic cooperation between carton and liner structure is obtained. This is of particular importance in employing the container of the invention on a practical and industrial scale in that by performing certain manipulations on the carton, the attached liner sheet will be automatically brought into operative position in which all of its terminal regions cooperate or overlap thereby greatly facilitating the use of the container, as it will be set forth more fully as the description proceeds.

Figure 1:
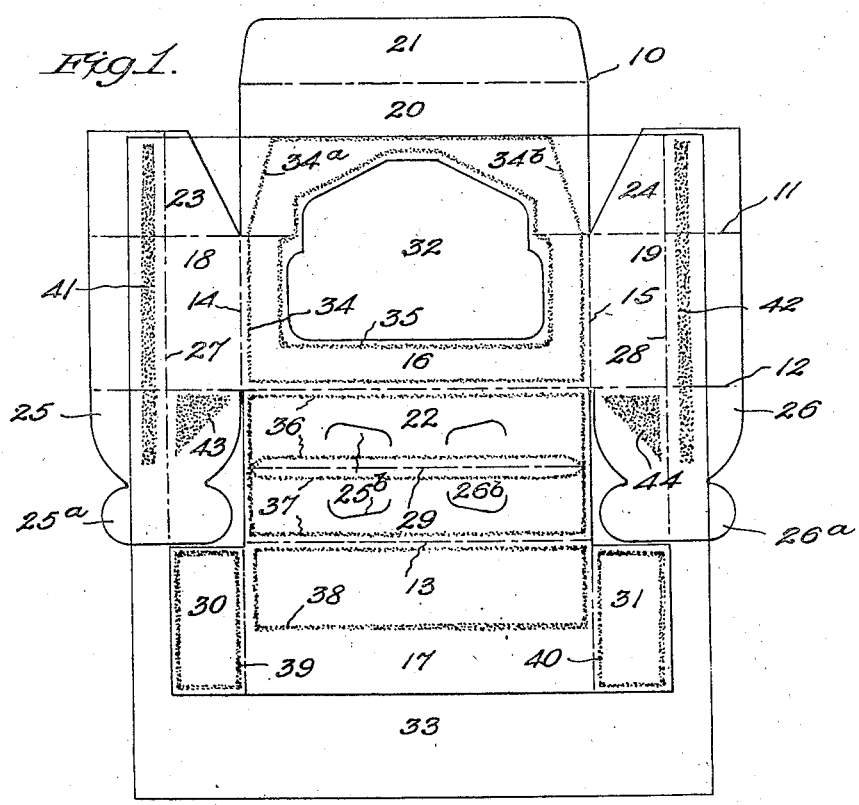
Fig. 1 illustrates a top elevational view of a carton blank embodying the principles of the present invention and having a liner attached thereto.

Referring now to Fig. 1 of the drawings, reference character 10 generally denotes a carton blank embodying the principles of the present invention. Blank 10 is provided with transverse score lines 11, 12, and 13 and with longitudinal score lines 14 and 15. These score lines define main panels 16 and 17 and a pair of end panels 18 and 19. In addition, main panel 16 is provided with hingedly connected top panel 20 with a closure flap, or extension, 21 and a bottom panel 22 is provided between main panels 16 and 17. End panels 18 and 19 are provided with top flaps 23 and 24, respectively, and with bottom closure flaps 25 and 26, respectively. Thumb tabs 25a and 26a are integrally formed with bottom closure flaps 25 and 26 and are adapted to cooperate with corresponding slits 25b and 26b, respectively, provided in bottom panel 22. Medial score lines 27 and 28 are located along the longitudinal center line of end panels 18 and 19 and a similar transverse medial line 29 is arranged in bottom panel 22. Main panel 17 is provided with hingedly connected side flaps 30 and 31 at its ends. It is to be observed that the general arrangement of the carton blank is somewhat similar to the blank disclosed in my co-pending application Ser. No. 255,030, filed February 7, 1939, to which reference is hereby made for further details. Front main panel 16 and part of top panel 20 is provided with a window 32 through which the contents are exposed to view.

The first step in the preparation of my novel container consists in attaching a liner sheet 33 to the blank by means of appropriately disposed glue lines. As it has been set forth in the foregoing, the liner sheet is preferably composed of a transparent or translucent cellulosic material such as glassine or Cellophane. Preferably a sheet of such character is used which is at least slightly permeable to air while at the same time it is resistant and impermeable to fats or grease. Liner sheet 33 has such dimensions as to extend beyond medial score lines 27 and 28 of end panels 18 and 19 respectively. The shape and location of the glue lines will be readily observed in Fig. 1. It will be noted that glue lines 34 and 35 are provided around window 32. Similar glue lines 36 and 37 are provided on the two halves of bottom panel 22, care being taken to avoid the provision of glue lines extending into any one of the score lines defining such panels. Main panel 17 is provided with an oblong shaped glue line 38 which, however, does not extend to the bottom edge of such panel but ends at a substantial distance therefrom. Similar closed oblong glue lines 39 and 40 are provided on side flaps 30 and 31 of main panel 17. A pair of longitudinally extending glue lines 41 and 42 are provided in end panels 18 and 19, respectively, beyond medial fold lines 27 and 28. In addition triangular glue surfaces 43 and 44 are provided in bottom end flaps 25 and 26, respectively. The object of this particular arrangement of glue lines will be more fully explained hereinafter.

Figure 2:
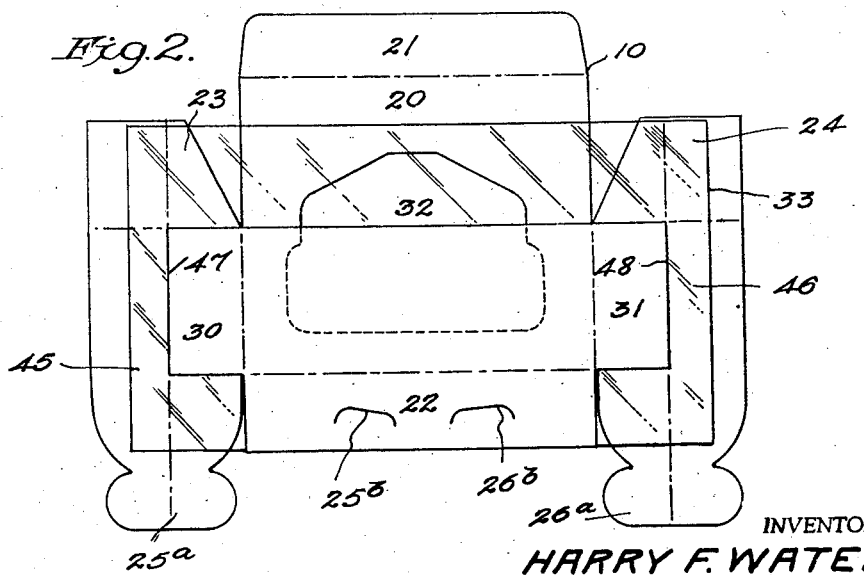
Fig. 2 depicts a similar view of the carton and liner structure folded along a transverse medial line.

The first step in converting carton blank 10 and liner 33 into a lined container of special character resides in folding carton blank and attached liner about transverse medial line 29 provided in bottom panel 22. This operation will provide the structure shown in Fig. 2. It will be noted that by folding carton 10, the liner has been simultaneously folded and its longitudinal and transverse edges have been brought into registering superposed position. The longitudinal edges of the liner extend beyond medial lines 27 and 28 of end panels 18 and 19 and are exposed to the exterior. These exposed superposed marginal strips of the liner denoted by reference characters 45 and 46 in Fig. 2, may be adhesively secured together or, in case the liner sheet is constituted of or coated with a fusible substance, may be permanently bonded together by the application of heat and pressure. I have found, however, that it is to be preferred to leave these marginal strips unsecured to each other and merely to rely on the special cooperation of carton and liner to maintain such strips in overlapping position. This procedure and the resulting structure are particularly advantageous for packaging bakery products because no air-tight closure is provided and "breathing" of the packaged bakery products is not prevented.

The next step illustrated in Fig. 3 consists in folding end panels 18 and 19 about their respective medial lines 27 and 28 and thereby folding the superposed marginal strips of the liner about the outer edge 47 and 48 of panels, or glue flaps, 30 and 31 hingedly connected to main panel 17. The outermost region of the end panels may be adhesively secured to glue flaps or panels 30 and 31. It will be noted that during this operation edges 47 and 48 cooperate with the end panels 18 and 19 and act as folding edges about which the marginal strips of the liner are folded. This operation completes the package and provides the structure illustrated in Fig. 3 which is an erectable container in flattened form collapsed on medial lines 27, 28 and 29. The container may be shipped and stored in this flattened condition in which it requires only a fraction of the space taken up by the container in its erected or set up condition.

When it is desired to fill the container of the invention, the flattened container is erected by applying pressure to its medial lines 27, 28 and preferably by also applying some pressure on the corresponding medial line 29 of the bottom panel. This operation will cause squaring up of the container into the shape shown in Fig. 4. All of the essential and novel structural characteristics of the package of the invention will be readily observed in this figure. Thus, it will be noted that bottom flaps 25 and 26 of end panels 18 and 19 are extended downwardly and have thumb tabs 25a and 26a integrally formed therewith. In addition, the two triangular tabs 49 and 50 extending from the bottom corners of the liner are attached to the corresponding bottom flaps 25 and 26 by means of the lowermost portion of glue lines 41 and 42 and triangular adhesive surfaces 43 and 44. These adhesive portions will attach tabs 49 and 50 to bottom flaps 25 and 26 in such manner that they will follow movements of such flaps. Thus, for example, flaps 25 and 26 may be folded against the outer surface of bottom panel 22 and thumb tabs 25a and 26a may be inserted into corresponding slits 25b and 26b whereby the bottom flaps and tabs 49 and 50 will be securely locked into position. In this locked condition of thumb tabs 25a and 26a the container will be maintained in its erected condition and its accidental collapse will be positively prevented. As a matter of fact, by folding bottom flaps 25 and 26 from a vertical into a horizontal position, a very great rigidity and reinforcement is imparted to the erected container structure.

A further important and interesting property of the erected container is the special locking effect to which the longitudinal marginal strips 45 and 46 of the liner are subjected. As it has been explained in the foregoing, this locking effect is due to the cooperation of end panels 18 and 19, folded about medial lines 27 and 28 and thereby folding marginal strips between the inner face of medially folded end panels 18 and 19 and glue flaps 30 and 31 which will maintain such strips of the liner in the illustrated face to face position without the necessity of any adhesive applied to the liner proper.

After the container has been locked in its erected condition by the operation of thumb tabs 25a and 26a, it is ready for filling and, for example, as shown in Fig. 5, a plurality such as half a dozen doughnuts may be inserted into the space defined by the liner within the box. Hereafter top end flaps 23 and 24 are pushed inwardly into the plane defined by the top hinge lines of the body of the carton. During this operation the special structure of top flaps 23 and 24 cooperates with the special shape of glue line 34 on top panel 16. As it will be best observed in Fig. 6, the diagonally cut edges 51 and 52 of top flaps 23 and 24 respectively will press against the corresponding portions of the liner sheet. Due to the fact that this liner sheet is attached to main panel 16 by means of glue lines 34 and 35, folding down of top flaps 23 and 24 will cause pulling down of top closure flap or panel 20, this cooperation being further determined and adjusted by means of inclined portions 34a and 34b of glue line 34. This cooperation will result in pulling down top closure flap 20 and at the same time pulling the top transverse marginal portion of liner 33 into an overlapping position with its corresponding bottom marginal portion. Extension 21 of top flap 20 may be now inserted into the space between main panel 17 and top closure flaps 23 and 24 thereby completely closing the filled container.

Fig. 7 illustrates the filled container in its completely closed position, turned around in order to have window 32 in the front portion thereof. This window extends through a portion of top flap or panel 20 and through a portion of main panel 16. Due to the transparent or at least translucent character of the liner sheet employed in the container of the invention, the contents may be readily observed and a package of attractive appearance having great sales appeal is obtained.

It will be noted that the present invention provides various important advantages. Thus, first of all, a container of simple and inexpensive construction is provided which may be shipped and stored in a collapsed or knocked-down condition. The duplex construction described in the foregoing makes it possible to combine great mechanical strength with complete grease-proofness, provided that a liner of suitable properties is employed.

It is also to be observed that the container of the invention is so constructed and arranged that the various folding operations required for converting the collapsed container into a finished package in which the packaged goods are completely surrounded and protected by the liner, are carried out completely automatically. This is due to the special arrangement and configuration of the score lines of the carton and of the glue lines attaching the liners to said carton.

Moreover, the container of the invention has such liner structure incorporated therein which, if desired, may be completely free from seams, the terminal regions of the liner being merely maintained in registering or overlapping position. Consequently, while it is practically impossible for dirt and dust to leak into the package or for grease contained in the bakery products to leak out of the package, the contents are not completely sealed from the atmosphere but are in restricted and controlled communication therewith. In other words, the packaged products are free to "breathe" and may be maintained in a fresh, wholesome and saleable condition for a relatively long time.

Although the present invention has been described in connection with a preferred embodiment thereof, variations and modifications may be resorted to by those skilled in the art without departing from the principles of the invention. I consider all of these variations and modifications to be within the true spirit and scope of the present invention as disclosed in the foregoing description and defined by the appended claims.

I claim:

1. A lined container adapted to be erected from collapsed form which comprises an outer carton cut and scored along a plurality of lines to define opposed pairs of main and end panels, a bottom panel between said main panels, top and bottom closure flaps for said end panels, and a top closure flap for one of said main panels; a medial score line in each of said end panels and in said bottom panel upon which said carton is collapsed, and a liner sheet attached to said carton by means of a plurality of glue lines and folded upon itself along the medial line of the bottom panel, said glue lines including lines securing the longitudinal marginal portions of the liner to a line beyond the medial fold line of the end panels whereby upon erection of said carton the liner will be likewise erected and said marginal portions of the liner will be maintained in registering face to face position without directly connecting such portions together.

2. A lined container adapted to be erected from collapsed form which comprises an outer carton cut and scored along a plurality of lines to define opposed pairs of main and end panels, a bottom panel between said main panels, top and bottom closure flaps for said end panels, and a top closure flap for one of said main panels; a medial score line in each of said end panels and in said bottom panel upon which said carton is collapsed, and a liner sheet attached to said carton by means of a plurality of glue lines and folded upon itself along the medial line of the bottom panel to open and to close therewith, said glue lines including lines securing the longitudinal marginal portions of the liner to a line beyond the medial fold line of the end panels and adhesive on the bottom flaps of the end panels whereby upon erection of said carton said liner will be likewise erected into a position in which said marginal portions thereof will be maintained in registering but disconnected face to face position and the triangular tabs formed in the bottom of the liner will be attached to corresponding end panel flaps for movement concurrently therewith.

3. A lined container adapted to be erected from collapsed form which comprises an outer carton cut and scored along a plurality of lines to define opposed pairs of main and end panels, a bottom panel between said main panels, top and bottom closure flaps for said end panels, and a top closure flap for one of said main panels; a medial score line in each of said end panels and in said bottom panel upon which said carton is collapsed, and a liner sheet adhesively secured to said panels by means of glue lines and medially folded along the medial line of the bottom panel, said glue lines including lines extending along the body and the flap portions of the end panels and securing the longitudinal marginal edges of the liner whereby upon erection of the carton said liner will be likewise erected and the bottom tab portions and the top mouth portions of the erected liner will automatically follow displacements of the bottom and top flaps into closing position.

4. A lined contained adapted to be erected from collapsed form which comprises an outer carton cut and scored along a plurality of lines to define opposed pairs of main and end panels, a bottom panel between said main panels, top and bottom closure flaps for said end panels, a top closure flap for one of said main panels, and lateral glue flaps for the other of said main panels; a medial score line in each of said end panels and in said bottom panel upon which said carton is collapsed; and a liner sheet adhesively secured to said carton and medially folded along the medial line of the bottom panel; said liner sheet having its registering longitudinal marginal portions interlocked between the inner face of the medially folded end panels and their corresponding glue flaps.

5. A lined container adapted to be erected from flat folded form which comprises a carton having opposed pairs of main and end panels, a top and a bottom panel and top and bottom closure flaps for said end panels, said carton being collapsed on medial fold lines in said end panels and bottom panel, a liner adhesively secured to said panels to have it open and close together with the carton and having its top terminal portions projecting above the body portion of the carton and attached to the top flaps and to the top panel whereby upon closing said top flaps the mouth portions of the liner will be automatically pulled into overlapping position, and thumb tabs incorporated into the bottom closure flaps and adapted to cooperate with corresponding slits in said bottom panel to lock the carton in its erected condition.

HARRY F. WATERS.